DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 6

T887,012
PHOTOGRAPHIC ELEMENTS HAVING NON-GELATIN OVERCOATS

Carl W. McGraw and Philip F. Hutton, both of 1669 Lake Ave., Rochester, N.Y. 14615

Filed Nov. 13, 1970, Ser. No. 89,324
**Int. Cl. G03c *1/76***
U.S. Cl. 96—67
1 Sheet Drawing. 14 Pages Specification

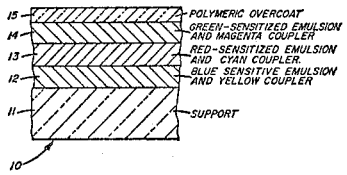

A photographic element such as photographic film or paper is overcoated with a layer of carboxymethylated casein or sodium ethylcellulose sulfate. Top coats of these polymers protect the photographic element against reticulation and permit rapid coating at elevated temperature during manufacture of the element and also high-temperature processing of the exposed photographic element. Especially useful embodiments comprise multilayer color film or paper having incorporated color couplers in the gelatino-silver halide emulsion layers and which are overcoated with about 40 to 90 mg./ft.$^2$ of carboxymethylated casein or sodium ethylcellulose sulfate. These protective overcoats can also be employed, for example, in matrix-type film used in dye diffusion transfer processes. Such a film comprises an unhardened gelatino-silver halide emulsion coated on a transparent support such as polyethylene terephthalate. This emulsion layer is overcoated with an anti-halation layer comprising unhardened gelatin and carbon black in a concentration, for example, of one part carbon black to one part gelatin by weight. In a typical imbibition process, the matrix film is exposed through the transparent film support and processed in a tanning developer to remove untanned gelatin, including the unhardened carbon-containing gelatin layer, and the non-gelatin protective overcoat. The imagewise differentially hardened gelatin is imbibed with dyes containing mordanting groups and the dyes are then transferred to a receiving sheet, as described in Mees, "Theory of the Photographic Process," 3rd ed., the MacMillan Company, N.Y. (1966), page 395.

June 1, 1971 C. W. McGRAW ETAL T887,012
PHOTOGRAPHIC ELEMENTS HAVING NON-GELATIN OVERCOATS
Filed Nov. 13, 1970
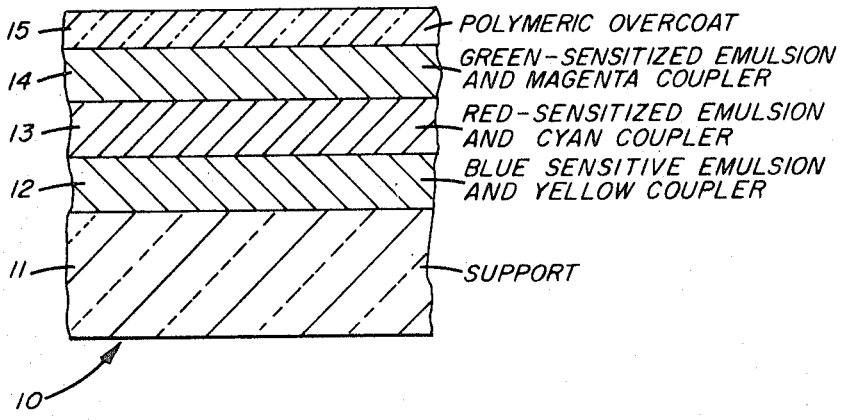
CARL W. McGRAW
PHILIP F. HUTTON
INVENTORS
BY Walter J. Parker
ATTORNEY